June 23, 1953 P. N. SHAW 2,642,755
SAFETY DEVICE FOR PRESSES
Filed Feb. 14, 1951 3 Sheets-Sheet 1
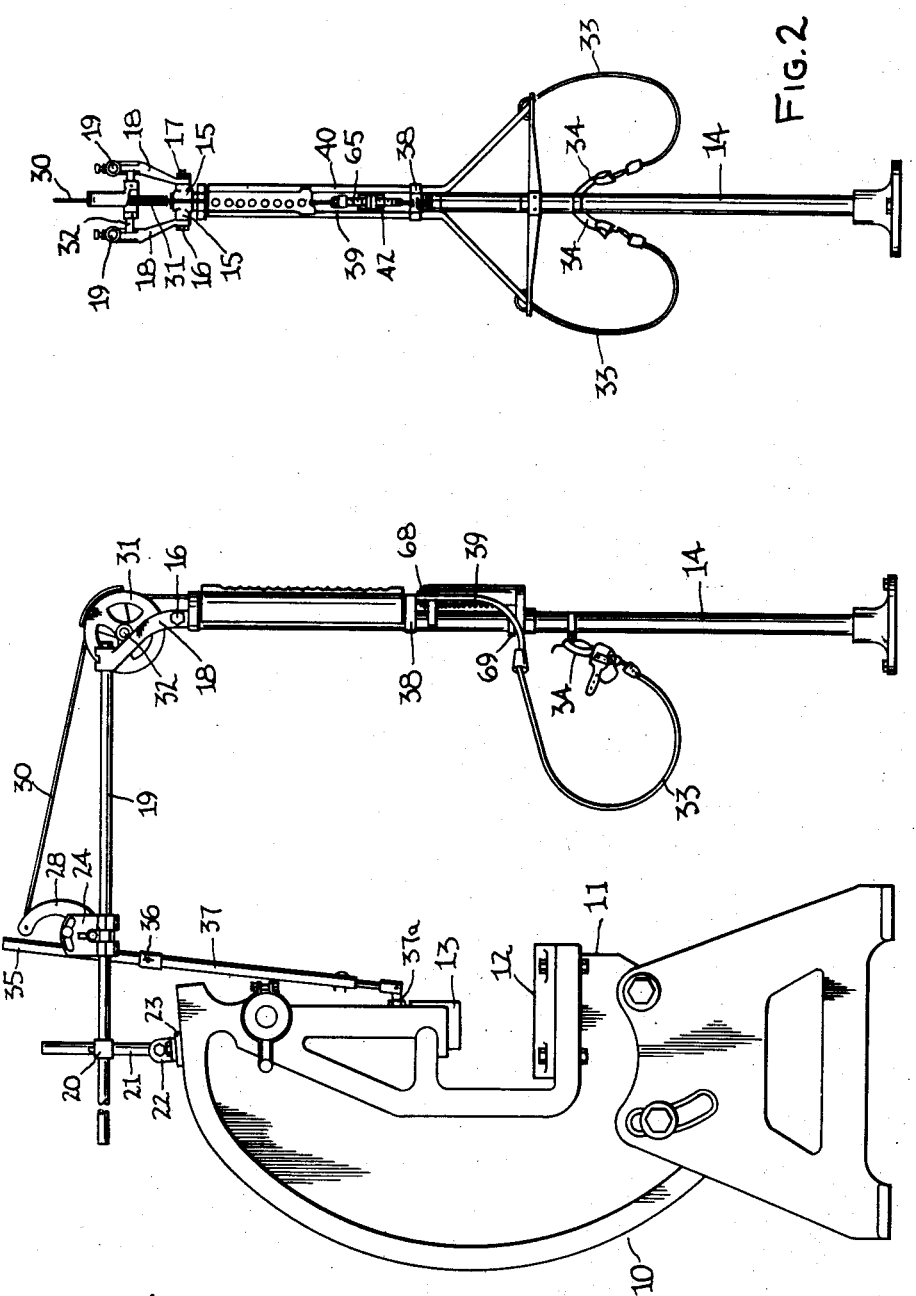
INVENTOR.
PAUL N. SHAW
BY
William Isler
ATTORNEY.

June 23, 1953  P. N. SHAW  2,642,755
SAFETY DEVICE FOR PRESSES
Filed Feb. 14, 1951  3 Sheets-Sheet 2

INVENTOR.
PAUL N. SHAW
BY
William Isler
ATTORNEY.

June 23, 1953
P. N. SHAW
2,642,755
SAFETY DEVICE FOR PRESSES
Filed Feb. 14, 1951
3 Sheets-Sheet 3
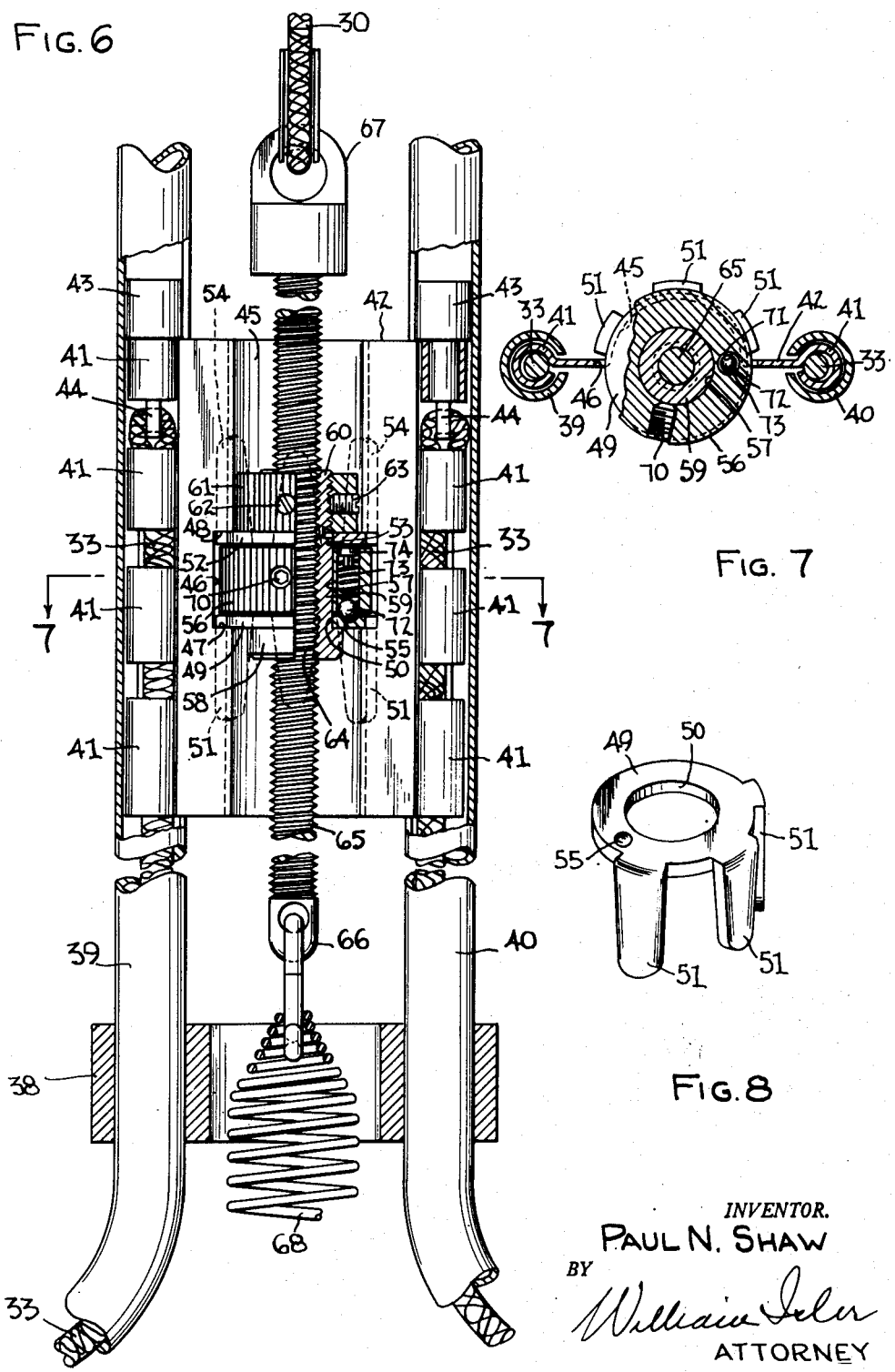
INVENTOR.
PAUL N. SHAW
BY
William Ish̄er
ATTORNEY Patented June 23, 1953

2,642,755

UNITED STATES PATENT OFFICE 2,642,755

SAFETY DEVICE FOR PRESSES

Paul N. Shaw, Shaker Heights, Ohio

Application February 14, 1951, Serial No. 210,971

16 Claims. (Cl. 74—615)

This invention relates, as indicated, to a safety device for presses.

In my U. S. Patent No. 2,427,928, there is disclosed a safety device for presses, in which one end of a cable 14 is secured to a sheave 13, the cable passing about a cam 12 and about a second sheave 15 which is rotatably supported on tie-rods 6. Means are also disclosed in Fig. 2 of that patent, but not described, consisting of a hand knob actuating a worm for adjusting the position of the end of the cable 14 circumferentially with respect to the sheave 13, so as to vary the effective length of the cable, and thereby the position at which the ends of the fingers of the press-operator are from the danger point.

Since this adjustment means is located at a relatively high point, particularly in presses of considerable height, access to said adjusting means is difficult, without a ladder, chair or other support, the use of which, in and around moving press or machine parts, creates an extra hazard.

As the result of considerable experimentation, I have developed what I term a floor level adjustment, located at a convenient level which is easily accessible to a man of any height, and the provision of which renders unnecessary the use of ladders, chairs or other devices, when the effective length of the cable is to be varied.

My floor level adjustment, moreover, is located at a point substantially removed from the operative parts of a press, so that the use of the adjustment is not attended by any hazard to life or limb.

The floor level adjustment of the present invention is also advantageous in that it consists of a minimum number of parts, which can be easily and quickly assembled or disassembled, and which has means incorporated therein for preventing the adjusting means from becoming loosened or otherwise moved from its position of adjustment.

Other objects and advantages of the invention will be apparent during the course of the following description.

In the accompanying drawings, forming a part of this specification, and in which like numerals are employed to designate like parts throughout the same, Fig. 1 is a side elevational view of a typical press, utilizing the novel features of the invention;

Fig. 2 is a front elevational view, as seen from the right of Fig. 1;

Fig. 6 is a view on an enlarged scale, of a portion of Fig. 2;

Fig. 7 is a cross-sectional view, taken on the line 7—7 of Fig. 6, and

Fig. 8 is a perspective view of one of the rope and cable clip brackets.

Figure 5:
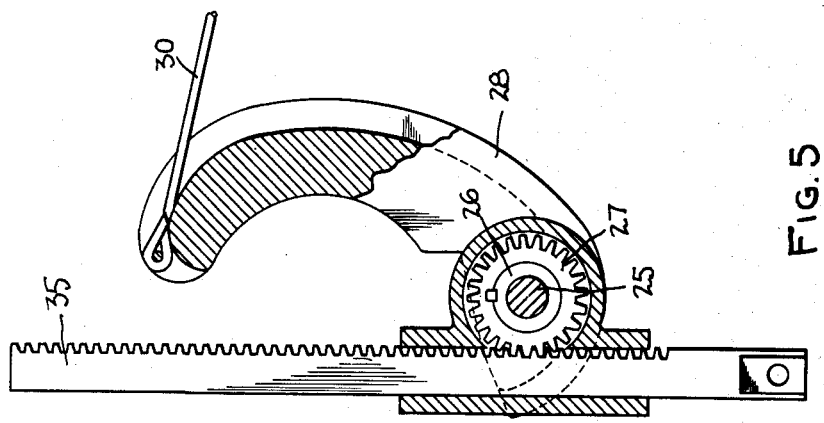
Fig. 5 is a cross-sectional view, taken on the line 5—5 of Fig. 4.

Referring more particularly to the drawings, reference numeral 10 designates a conventional punch press having a stationary base 11, provided with a bed, or work table 12, on which the work is placed, and the usual reciprocating punch or ram 13.

The safety device, in this case, is supported by a pipe or standard 14, to the upper end of which spacers 15 are secured, as by a bolt 16 and nut 17. Secured to these spacers 15 are brackets 18, which support the ends of a pair of tie rods 19, the other ends of these tie rods being supported by brackets 20 carried by a post 21, which, in turn, is supported by angle brackets 22 secured to an adaptor plate 23 attached to the base 11 of the press.

Clamped to the tie rods 19, adjacent the base 11 of the press is a bracket 24 having rigidly secured therein a cam shaft 25, on the central portion of which is journalled a sleeve 26, to which is keyed a gear 27. The gear 27 is operatively connected to a cam 28 which is also journalled on the shaft 25, the connection being such that rotation of the gear 27 in either direction causes a corresponding movement of the cam 28 about the shaft 25.

The cam 28 has secured thereto one end of a cable 30, the cable passing about a sheave 31, which is rotatably supported on a shaft 32 carried by the brackets 18. The opposite end of the cable is operatively connected to a pair of flexible members 33, to the ends of which are connected hand straps 34, which are adapted to be fitted to the hands of the operator.

The bracket 24 has slidably mounted therein for reciprocal movement a gear-rack 35, which is in mesh with the gear 27.

The lower end of the rack 35 is connected, as by a pin 36, to a connecting rod 37, the lower end of which is connected to a stud 37a extending from the ram 13 of the press. The connection is such that as the ram descends, its downward movement is communicated to the rack 35, causing the gear 27 to be rotated in a counterclockwise direction, as viewed in Fig. 3, which in turn, causes the cam 28 to be rocked in a counter-clockwise direction about the shaft 25. This causes a pull to be exerted on the cable 30, causing the hands of the operator to be pulled away from the press by means of the hand straps 34, to which the cable is operatively connected, and insuring that the operator's hands will not in any way be injured by the ram or work.

The present invention is concerned more particularly with the operative connection between the cable 30 and the flexible members 33, whereby the effective length between the point of connection of the cable 30 to the sheave 28 and the hand straps 34 may be varied. This connection will now be described.

Rigidly secured to the tubular standard 14 is a bracket 38, in which is secured a pair of spaced tubular guides 39 and 40 for the tubular flanges 41 of a metallic clip 42. The flexible cords or members 33 extend through the tubular guides 39 and 40, and their upper ends extend through the tubular flanges 41 of the clip 42, being rigidly clamped or gripped within these flanges. Guide plugs 43 are supported by the uppermost of the flanges 41 and are provided at their lower ends with apertured lugs 44, to which the upper ends of the cords 33 are secured.

The clip 42 is provided intermediate its side edges with a semicircular portion 45, a portion of which is removed to provide an opening 46, defined, in part, by a lower edge 47 and an upper edge 48. Secured within the opening 46, against the edge 47, is an annular bracket 49 having a circular opening 50 therein. The bracket 49 is provided with downturned circumferentially-spaced ears 51, which are spot welded to the outer face of the portion 45 of the clip. Similarly secured within the opening 46, against the edge 48, is an annular bracket 52 having a circular opening 53 therein, in axial alignment with the opening 50. The bracket 52 is provided with upturned circumferentially-spaced ears 54, which are spot welded to the outer face of the portion 45 of the clip. The bracket 49 is provided at one point in its circumference, on the upper face thereof, with a spherical recess 55, the function of which will be presently explained.

Interposed between the brackets 49 and 52 is a knurled collar 56 having a central opening 57 therethrough of the same diameter as the openings 50 and 53.

Disposed immediately subjacent the lower surface of the bracket 49 is the head 58 of a bolt, having a smooth faced stem 59 which extends through the aligned openings 50, 53 and 57, this stem having a slide fit in these openings. The stem 59 of the bolt is provided with a threaded extension 60, above the upper surface of the bracket 52, and secured to this threaded extension is a nut 61 having a knurled outer surface. This nut, when screwed substantially into engagement with the upper surface of the bracket 52, is effective to prevent displacement of the bolt 58—59—60 from the brackets 49 and 52. It may be locked against rotation relatively to the bolt by means of set screws 62 and 63.

The bolt has a threaded opening 64 extending axially therethrough, in which opening a screw 65 is threadedly secured. The screw 65 is provided at its lower end with an eye 66, and has secured to its upper end a screw eye 67.

The cable 30 is secured at its lower end to the screw eye 67.

Secured to the lower end of the screw 65 is a tension coil spring 68, the lower end of which is secured to a bracket 69 mounted on the standard 14. This spring places the cable 30 under tension, so as to normally urge the cam 28 to its rearmost position.

Figure 3:
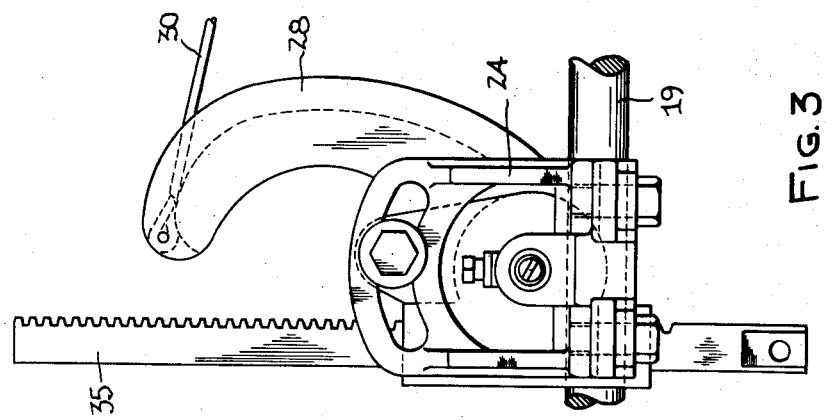
Fig. 3 is a view, on an enlarged scale of a portion of the mechanism shown in Fig. 1.
Figure 4:
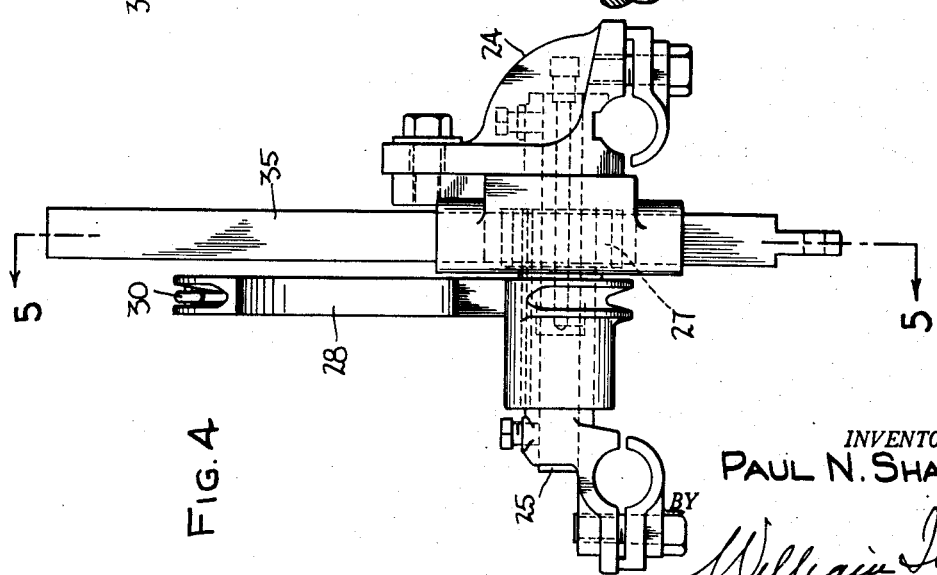
Fig. 4 is a view of the parts shown in Fig. 3, as viewed from the left of Fig. 3.

When the ram 13 is in its uppermost position, the operator's hands are free to approach the press and are in readiness to remove the work piece from the press as soon as the latter has been released by the ram. As the ram descends, the rod 37 is pulled downwardly, causing the rack 35 to descend, rocking the cam 28 in a counterclockwise direction, as shown in Fig. 3. This exerts a pull on the cable 30, which pull is exerted through the screw 65, clip 42, cords 33 and hand straps 34 to pull the operator's hands away from the press, thereby insuring that the operator's hands will not, in any way, be injured by the ram or work.

On the upstroke of the ram, the spring 68 is again effective to return the cam 28 to its rearmost position, thereby permitting the operator's hands to again approach the press.

The collar 56 is secured in non-rotating relation with respect to bolt stem 59, by means of a socket head set screw 70 which extends through the collar and is screwed tightly against the bolt stem.

By rotating the collar 56 in one direction or another, the clip 42 is raised or lowered, depending on the direction of rotation of the collar 56, thereby adjusting the location of the hand straps 34 with respect to the press. This is equivalent in result to a variation in the effective length of the cable 30, which was previously accomplished by the adjustment means described above in connection with my Patent No. 2,427,928.

In order to provide a means for maintaining the adjusting nut or collar 56 in its finally adjusted position, and to prevent it from becoming jarred loose or loosened in any other accidental manner, which would throw the adjustment out of position, I have provided the following means:

The collar 56 is provided with an opening 71, adjacent its periphery, which opening extends substantially parallel with the axis of the collar. Located at one end of this opening in such a manner as to protrude slightly from the opening is a ball 72, which is normally maintained in position by means of a compression coil spring 73, which bears at one end against the ball, and is itself, maintained under compression by the ball and by a plug 74 threadedly secured in the opposite end of the opening 71.

As the collar 56 is rotated, the ball 72 is forced by the spring 73 into the spherical recess 55 in the bracket 49 once during each revolution of the collar. This is accomplished by a clicking noise, and at the same time is communicated through the fingers by the sense of touch. In this manner, the extent of adjustment can be readily determined without measurement, since if the adjuster knows the pitch of the thread of the screw 65, he can determine the amount of the adjustment by multiplying the pitch by the number of revolutions of the collar 56.

At the same time, when the ball 72 is in the spherical recess 55, the pressure of the compression coil spring on the ball is such as to prevent the collar or nut 56 from becoming jarred loose or loosened in any other accidental manner, which would throw the adjustment out of position.

It will be noted that the aforesaid adjustment is located at a convenient level, near the floor level, and is therefore easily accessible to a man of any height. Its use renders unnecessary the use of ladders, chairs or other devices, when the position of the hand straps is to be varied.

The floor level adjustment is moreover, located at a point substantially removed from the operative parts of the press, so that use of the adjustment is not attended by any hazard to life or limb. It consists of a minimum number of parts, which can be easily and quickly assembled, and has means incorporated therein for affording an indication, through the senses of touch and hearing, of the extent or degree of the adjustment, and for preventing the adjustment from becoming accidentally loosened.

Although I have shown sheave 13 of my Patent No. 2,427,928 as eliminated, in some cases, as when the punch press is to be inclined, it is desirable to retain the multiplier arrangement of my Patent No. 2,427,928, and in such cases, the multiplier arrangement which includes the sheave 13 and the hand knob and worm for adjusting the position of the end of the cable 14 circumferentially with respect to the sheave 13, may be retained, in addition to the adjustment which is the subject of this invention.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim

1. In combination with a press having a ram, means responsive to the operative stroke of the ram for pulling the press operator's hands away from the press, said means including a clip slidable relative to a fixed guide, flexible members secured to said clip, a cable operatively associated with said ram, and means associated with said clip and said cable for varying the distance between said cable and the ends of said flexible members and means for maintaining said cable under tension.

2. The combination as defined in claim 1, in which said penultimate named means includes spaced brackets mounted on said clip, a bolt rotatably mounted in said brackets, and a nut disposed between said brackets and operatively connected to said bolt.

3. The combination as defined in claim 2, in which a sleeve is provided, which is threadedly connected to said bolt and is adapted to coact with the head of the bolt for preventing axial displacement of the bolt from the brackets.

4. The combination as defined in claim 3, in which a screw is provided, which passes through the bolt and is threadedly connected to said bolt.

5. The combination as defined in claim 4, in which the upper end of said screw is secured to said cable.

6. The combination as defined in claim 5, in which means are provided for indicating a complete revolution of the nut.

7. The combination as defined in claim 6, in which said indicating means comprises a ball seat in one of said brackets, and a spring-pressed ball carried by said nut, said ball movable into said seat with a clicking noise upon each revolution of the nut.

8. The combination as defined in claim 1, in which said penultimate named means is located at a level which is accessible to a person standing on the floor of the room in which the press is located.

9. In a device of the character described, a clip comprising a metallic plate having a portion thereof curved to substantially semi-circular form, an opening in said curved portion, spaced brackets secured within said opening, each of said brackets having a circular opening therein, and means for attaching said brackets to said clip.

10. A device as defined in claim 9, in which said means comprises ears formed integrally with said brackets and welded to the rear face of said semi-circular curved portion of the clip.

11. A device, as defined in claim 9, in which a bolt is rotatably mounted in the openings of said brackets, and a nut is disposed between said brackets and is operatively connected to said bolt for the purpose of rotating the bolt.

12. A device, as defined in claim 11, in which a sleeve is provided, which is threadedly connected to said bolt and is adapted to coact with the head of the bolt for preventing axial displacement of the bolt from the brackets.

13. A device, as defined in claim 12, in which a screw is provided, which passes through the bolt and is threadedly connected to said bolt.

14. A device, as defined in claim 13, in which one end of said screw is provided with means adapted for the attachment thereto of a cable.

15. A device, as defined in claim 14, in which means are provided for indicating a complete revolution of the nut.

16. A device, as defined in claim 15, in which said indicating means comprises a ball seat in one of said brackets, and a spring-pressed ball carried by said nut, said ball movable into said seat with a clicking noise upon each revolution of the nut.

PAUL N. SHAW.

References Cited in the file of this patent

UNITED STATES PATENTS

| Number | Name | Date |
| --- | --- | --- |
| 1,325,179 | Von Post | Dec. 16, 1919 |
| 1,580,877 | Barber | Apr. 13, 1926 |
| 2,367,740 | Schubert | Jan. 23, 1945 |
| 2,403,828 | Rawlings et al. | July 9, 1946 |
| 2,420,364 | Espenas | May 13, 1947 |
| 2,427,928 | Shaw | Sept. 23, 1947 |
| 2,429,065 | Korkowski | Oct. 14, 1947 |

FOREIGN PATENTS

| Number | Country | Date |
| --- | --- | --- |
| 811,574 | France | Jan. 18, 1937 |